US008429320B2

(12) United States Patent
du Preez et al.

(10) Patent No.: US 8,429,320 B2
(45) Date of Patent: Apr. 23, 2013

(54) METHOD AND SYSTEM FOR DYNAMICALLY PROGRAMMABLE SERIAL/PARALLEL BUS INTERFACE

(75) Inventors: Andrew du Preez, Carlsbad, CA (US); Yi Zhou, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 302 days.

(21) Appl. No.: 12/755,755

(22) Filed: Apr. 7, 2010

(65) Prior Publication Data

US 2011/0153887 A1    Jun. 23, 2011

Related U.S. Application Data

(60) Provisional application No. 61/288,040, filed on Dec. 18, 2009.

(51) Int. Cl.
*G06F 13/00* (2006.01)
(52) U.S. Cl.
USPC .......................................... 710/106; 710/305
(58) Field of Classification Search .................. 710/106, 710/104, 305, 100; 370/438
See application file for complete search history.

(56) References Cited

U.S. PATENT DOCUMENTS 5,628,001 A  *  5/1997  Cepuran ....................... 713/501
5,936,960 A  *  8/1999  Stewart ........................ 370/438

* cited by examiner

*Primary Examiner* — Brian Misiura
*Assistant Examiner* — Kim Huynh
(74) *Attorney, Agent, or Firm* — Sterne, Kessler, Goldstein & Fox P.L.L.C.

(57) ABSTRACT

Aspects of a method and system for dynamically programmable serial/parallel bus interface may include performing in a first communication device coupled to a communication bus, attaching communication protocol information to a data signal for each data transaction with one or more other communication devices communicatively coupled to the communication bus. The one or more other communication devices may be controlled utilizing the attached communication protocol information. The communication protocol information may be dynamically adjusted and/or adaptively adjusted. The communication bus may be a serial or parallel communication bus. The serial communication bus may be a two-wire, three-wire, or four-wire bus. The attached communication protocol information comprises a multi-wire protocol, a 3-wire protocol, a Serial Peripheral Interface (SPI) protocol, a System Power Management Interface (SPMI), or an RF Bus protocol.

20 Claims, 5 Drawing Sheets

METHOD AND SYSTEM FOR DYNAMICALLY PROGRAMMABLE SERIAL/PARALLEL BUS INTERFACE

CROSS-REFERENCE TO RELATED APPLICATIONS/INCORPORATION BY REFERENCE

This application makes reference to, claims priority to, and claims the benefit of U.S. Provisional Application Ser. No. 61/288,040, filed on Dec. 18, 2009.

FIELD OF THE INVENTION

Certain embodiments of the invention relate to coexistence in communication systems. More specifically, certain embodiments of the invention relate to a method and system for dynamically programmable serial/parallel bus interface.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

In this same spirit of the 'anytime, anywhere' paradigm, there is a drive towards making content stored on portable devices available to a large number of devices over a variety of radio frequency technologies. For example, many portable media devices may be operable to provide a video output signal to a computer monitor or a television to allow display of, for example, digital photographs. For audio content, one possible output format may be a low-power FM transmission signal. Such integrated multi-purpose portable devices comprising multi-radio devices or components may interfere with each other.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for dynamically programmable serial/parallel bus interface, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamically programmable serial/parallel bus interface. Aspects of the invention may comprise performing in a first communication device coupled to a communication bus, attaching communication protocol information to a data signal for each data transaction with one or more other communication devices communicatively coupled to the communication bus. The one or more other communication devices utilizing the attached communication protocol information may be controlled utilizing the attached communication protocol information. The communication protocol information may be dynamically adjusted and/or adaptively adjusted. The communication bus may be a serial or parallel communication bus. The serial communication bus may be a two-wire, three-wire, or four-wire bus. The attached communication protocol information comprises a multi-wire protocol, a 3-wire protocol, a Serial Peripheral Interface (SPI) protocol, a System Power Management Interface (SPMI), or an RF Bus protocol. The communication devices may be radio transceivers, and the radio control access may be controlled utilizing the attached communication protocol information. One or more clock counts in the attached communication protocol information may be adjusted to control one or more associated control signals.

Figure 1:
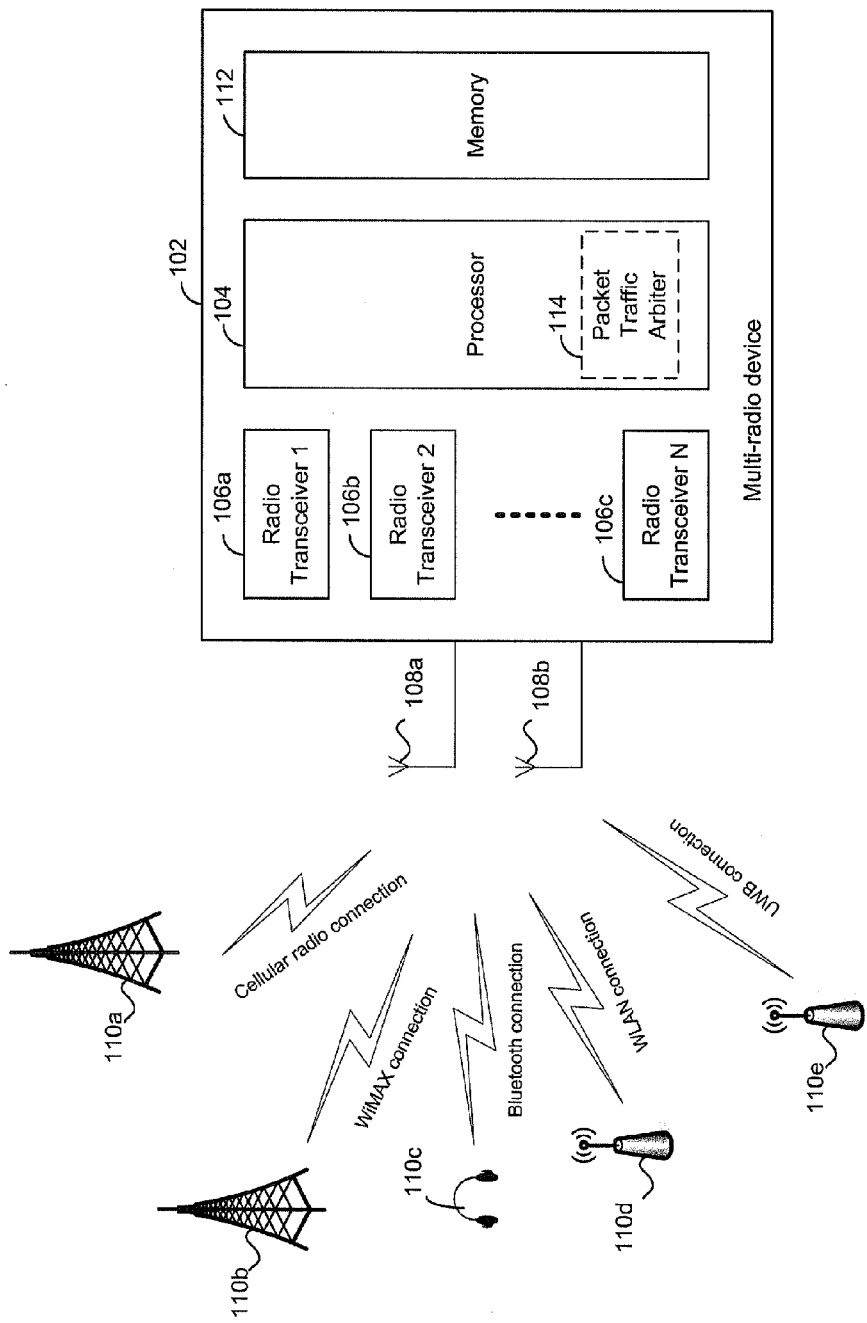
FIG. 1 is a block diagram illustrating an exemplary multi-radio system comprising a dynamically programmable serial/parallel bus interface, in accordance with an embodiment of the invention.

FIG. 1 is a block diagram illustrating an exemplary multi-radio system comprising a dynamically programmable serial/parallel bus interface, in accordance with an embodiment of the invention. Referring to FIG. 1, there is shown a multi-radio device 102, comprising a processor 104, memory 112, and a plurality of radio transceivers, of which radio transceiver 106a, radio transceiver 106b, and radio receiver 106c may be illustrated. The multi-radio device 102 may be communicatively coupled to one or more antennas, of which antennas 108a and 108b may be illustrated. There is also shown a cellular base station 110a, a WiMAX base station 110b, headphones 110c, a Wireless Local Area Network (WLAN) access point 110d, and an Ultra-Wideband (UWB) access point 110e.

The multi-radio device 102 suitable logic, circuitry, interfaces and/or code that may be operable to generate and/or receive radio-frequency (RF) signals in accordance with one or more RF technologies. The multi-radio device 102 may be operable to perform, for example, baseband signal processing in the processor 104.

The processor 104 may comprise suitable logic, circuitry, interfaces and/or code that may be operable to perform a variety of signal processing tasks and may comprise controlling of the radio transceivers 106a through 106c, for example. The processor 104 may be operable to arbitrate packet traffic via a packet traffic arbiter 114.

The packet traffic arbiter 114 may comprise suitable logic, circuitry, interfaces and/or code that may be operable to control access to a transmission media for the radio transceivers 106a through 106c, for example. In accordance with various embodiments of the invention, the packet traffic arbiter 114 may be implemented via, for example, a processor 104, and/or may be implemented via separate hardware.

The memory 112 may comprise suitable logic, circuitry, interfaces and/or code that may be operable to store data and/or code that may be accessed by the processor 104 and/or the radio transceivers 106a through 106c (1-N).

The radio transceiver 106a may comprise suitable logic, circuitry, interfaces and/or code that may be operable to generate RF signals and intermediate frequency (IF) signals from baseband signals, which may be communicated from the processor, in accordance with a radio frequency technology and/or standard. In addition, the radio transceiver 106a may comprise suitable logic, circuitry, interfaces and/or code that may be operable to receive RF signals via one or more antennas, for example, antennas 108a and 108b, and convert the RF signals to baseband signals. The generated baseband signals may be desirably formatted for further processing in the processor 104, for example. The radio transceivers 106b through 106c (2-N) may be substantially similar to radio transceiver 106a but may operate in accordance with different radio technologies. The radio transceivers 106a through 106c (1-N) may, for example, generate and/or receive signals in accordance with cellular radio standards (UMTS, GSM, EDGE, HSDPA, EV-DO, CDMA 2000 and others), broadband standards (for example WiMAX IEEE 802.16, WiBro), and short-range communication standards (WLAN IEEE 802.11, UWB, ZigBee and others). In some instances, the radio transceivers 106a though 106c may be operable to conform to multiple radio frequency technologies, for example when a radio transceiver may be a software-defined radio platform.

Each of the plurality of antennas communicatively coupled to the multi-radio device 102, for example antennas 108a and 108b, may comprise suitable circuitry, logic, interfaces and/or code that may enable them to be communicatively coupled to one or more radio transceivers 106a through 106c. Each of the radio transceiver 106a through 106c may be communicatively coupled to at least one antenna, and some antennas may be shared between a plurality of radio transceivers. Each radio transceiver 106a through 106c may receive and/or transmit RF signals in accordance with an RF technology to/from another device, for example, a cellular basestation 110a, a WiMAX basestation 110b, a Bluetooth headphone 110c, a WLAN access point 110d, and/or a UWB access point 110e. In accordance with various embodiments of the invention, the components of the multi-radio device 102 may be implemented in a single chip, or with multiple chips and associated circuitry.

Figure 2:
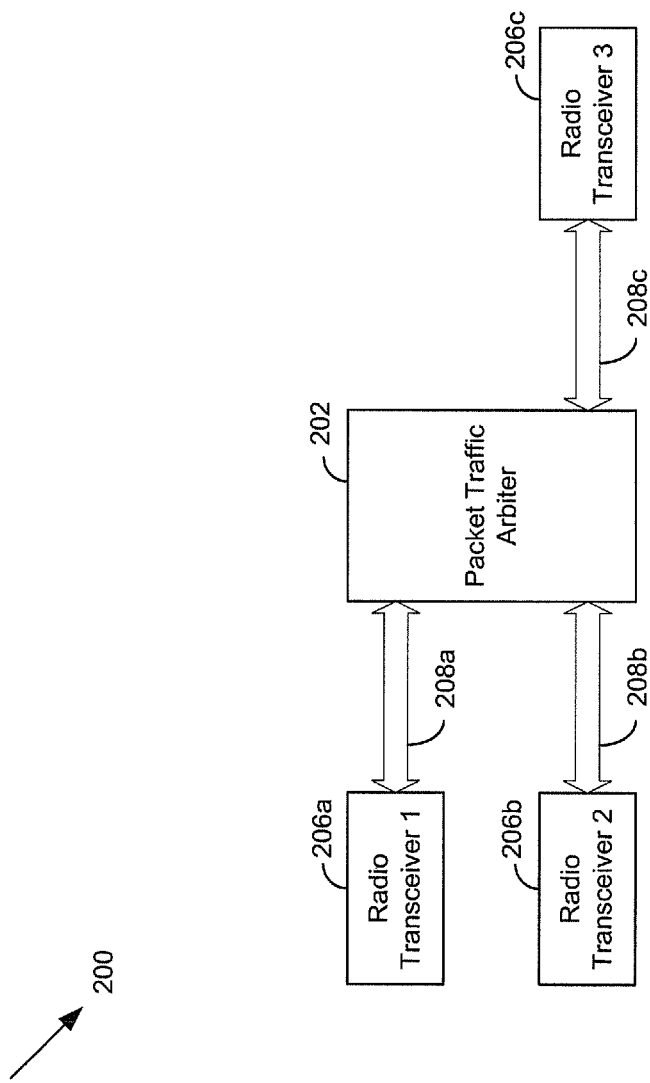
FIG. 2 is a block diagram illustrating an exemplary packet traffic arbitration system, in accordance with an embodiment of the invention.

FIG. 2 is a block diagram illustrating an exemplary packet traffic arbitration system, in accordance with an embodiment of the invention. Referring to FIG. 2, there is shown a packet traffic arbitration system 200 comprising a packet traffic arbiter 202, a plurality of radio transceivers, of which radio transceiver 206a through 206 (1-3) may be illustrated. There is also shown communication links 208a, 208b, and 208c.

The packet traffic arbiter 202 may comprise suitable logic, circuitry, interfaces and/or code that may be operable to control traffic flow and/or access to the radio resources of a plurality of radio transceivers in a system. In accordance with various embodiments of the invention, the packet traffic arbiter 202 may be substantially similar to the packet traffic arbiter 114 illustrated in FIG. 1.

The radio transceivers 206a, 206b, and 206c may be substantially similar to the radio transceivers in FIG. 1.

The communication links 208a, 208b and 208c may comprise suitable devices, interfaces and/or code that may be operable to facilitate communications between radio transceivers and the packet traffic arbiter (PTA).

In multi-radio systems as illustrated in FIG. 1, the radio transceivers may often be physically co-located. Some radio transceivers may operate in the same or similar frequency bands. Table 1 may show some exemplary radio technologies and their associated frequency bands:

TABLE 1

Exemplary frequency bands

| Wireless Technology | Frequency Band |
|---|---|
| Cellular: | |
| CDMA/GPRS | 824-894 MHz, 800-960 MHz, 1170-1880 MHz, 1850-1900 MHz |
| W-CDMA/UMTS | 2110-2170 MHz |
| EDGE | 824-960 MHz, 1710/1990 MHz |
| HSDPA | 2110-2170 MHz |
| Bluetooth 2.0 | 2.402-2.480 GHz |
| UWB (and Bluetooth 3.0) | 3.6-10.1 GHz |
| WiFi (IEEE 802.11a/b/g/n) | 2.4 GHz, 5.15-5.825 GHz |
| WiMAX/WiBro (IEEE 802.16a) | 2.3 GHz, 2.5 GHz, 3.3-3.8 GHz |
| FM | 76-108 MHz |
| GPS | 1.2 GHz, 1.5-1.6 GHz |
| DVB-H TV | 1.6-1.7 GHz |

In some instances, radio transceivers may interfere with each other because of simultaneous or nearly simultaneous operation, and/or because one radio transceiver may desire to transmit while another radio transceiver may desire to receive, for example. In these instances, centralized traffic control that may help to avoid interference and hence errors, that may lead to lost packets.

Exemplary interfaces comprising the 2-wire interface, the 3-wire interface, and the 4-wire interface may be utilized in some instances for interference avoidance. In some instances, these multi-wire interfaces may be proprietary. The wire interfaces may, however, only work for two radio transceivers and may be used to improve Bluetooth-WLAN coexistence and/or antenna sharing in some instances. The 3-wire interface, for example, may be used for Bluetooth-WLAN coexistence, in accordance with the IEEE 802.15.2 Recommended Practice.

In accordance with various embodiments of the invention, the PTA 202 may exchange information with the radio transceivers 206a, 206b, and 206c via the communication links 208a, 208b, and 208c. The information exchanged may be used by the PTA 202 to coordinate receiving and transmitting activities by the radio transceivers, for example radio transceivers 206a, 206b, and 206c. By exchanging desirable information between the radio transceivers and the PTA 202, the PTA 202 may employ coordination algorithms that may reduce or eliminate traffic collisions and increase efficiency. Thus, exemplary information that may be communicated between the PTA 202 and the radio transceivers 206a, 206b, and 206c may comprise transmission coordination information, handover information, and spectrum management information, to control the radio transceivers 206a, 206b, and 206c efficiently. In some instances, coordination may aid in making handover decisions, for example in deciding to handover a phone call from a cellular radio transceiver to a Voice-over-IP (VoIP) call via a short-range radio transceiver, for example WLAN. A further benefit may be coordination of low-power activities by the radio transceivers. For example, scanning the spectrum for nearby nodes, or sending periodic messages to a nearby access point and/or basestation, or receiving broadcast information may be achieved more efficiently by the radio transceivers if they are coordinated. A reduction in interference for such low-power activities, as well as in active transmission and reception activities may reduce power consumption and increase battery life, for example stand-by times. In some instances, by judiciously selecting desirable radio transceiver combinations and parameters, it may be possible, for example, to receive Bluetooth frames concurrently with the transmission of WLAN acknowledgement (ACK) packets, by selecting desirable transmit power levels.

Figure 3:
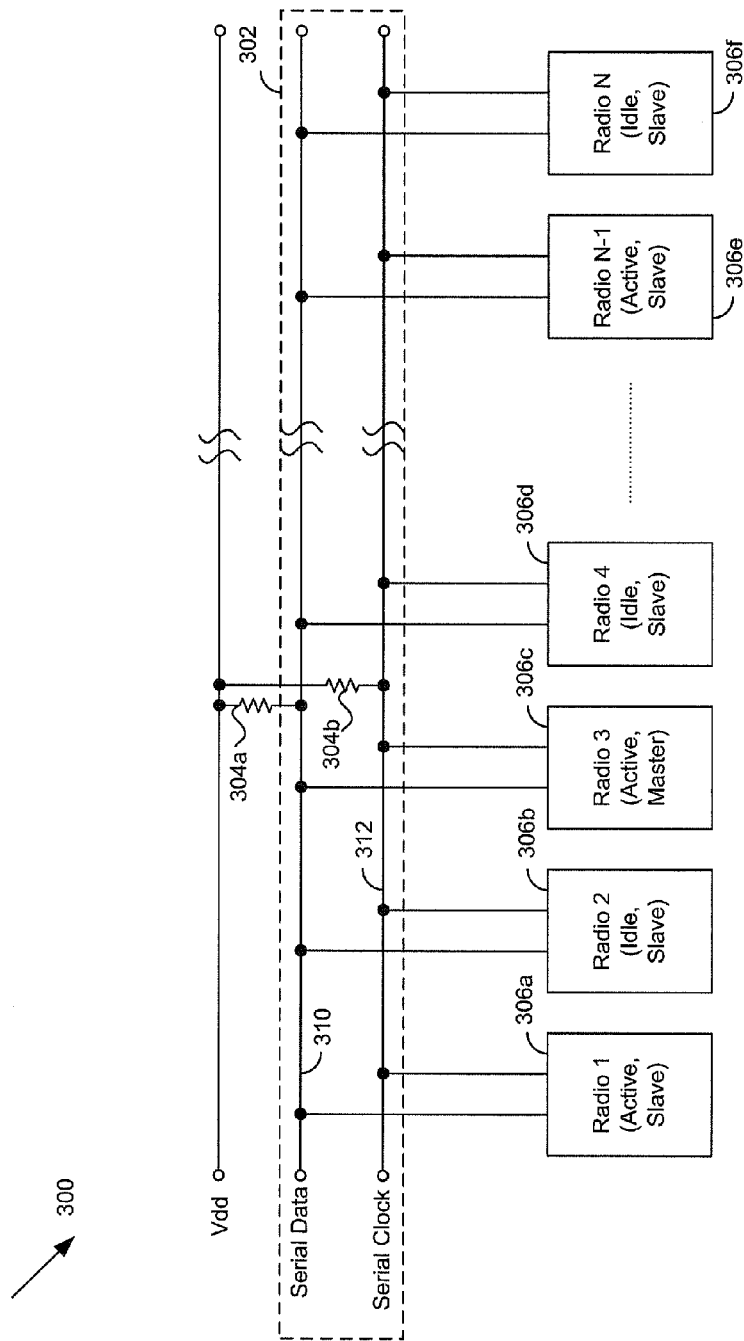
FIG. 3 is a block diagram illustrating an exemplary multi-radio coexistence system comprising a dynamically programmable serial/parallel bus interface, in accordance with an embodiment of the invention.

FIG. 3 is a block diagram illustrating an exemplary multi-radio coexistence system comprising a dynamically programmable serial/parallel bus interface, in accordance with an embodiment of the invention. Referring to FIG. 3, there is shown a coexistence system 300 comprising a serial bus 302 and a plurality of radio transceivers, of which radio transceivers 306a through 306f may be illustrated. The serial bus 302 may comprise a serial data line 310, and a serial clock line 312.

The serial bus 302 may comprise suitable logic, circuitry, interfaces and/or code that may be operable to communicate data between a plurality of communication entities that may be communicatively coupled to the serial bus 302. The serial bus 302 may comprise a serial data line 310 and a serial clock line 312. The serial data line 310 may be coupled to a supply voltage Vdd via a pull-up resistor 304a, and the serial clock line 312 may be coupled to the supply voltage Vdd via a pull-up resistor 304b.

Each of the plurality of radio transmitters, for example radio transceivers 306a through 306f, may comprise suitable logic, circuitry, interfaces and/or code that may be operable to generate RF signals and intermediate frequency (IF) signals from baseband signals that may be communicated from the processor, in accordance with a radio frequency technology and/or standard. In addition, each of the radio transceivers 306a through 306f, for example, may be operable to communicate to each other and, in some instances, to other devices via the serial bus 302.

In most instances, it may be desirable that any one radio transceiver, for example, any one of radio transceivers 306a through 306f may be a packet traffic arbiter (PTA), in accordance with the needs in the system. In this regard, the PTA may be chosen from among the active nodes. In some instances, the PTA may be an inactive radio transmitter that may have sufficient extra processing power to coordinate among the plurality of radio transceivers. The PTA node, for example radio transceiver 306c, as illustrated in FIG. 3, may coordinate the activities of the plurality of radio transceivers to minimize the interference between them.

Figure 4A:
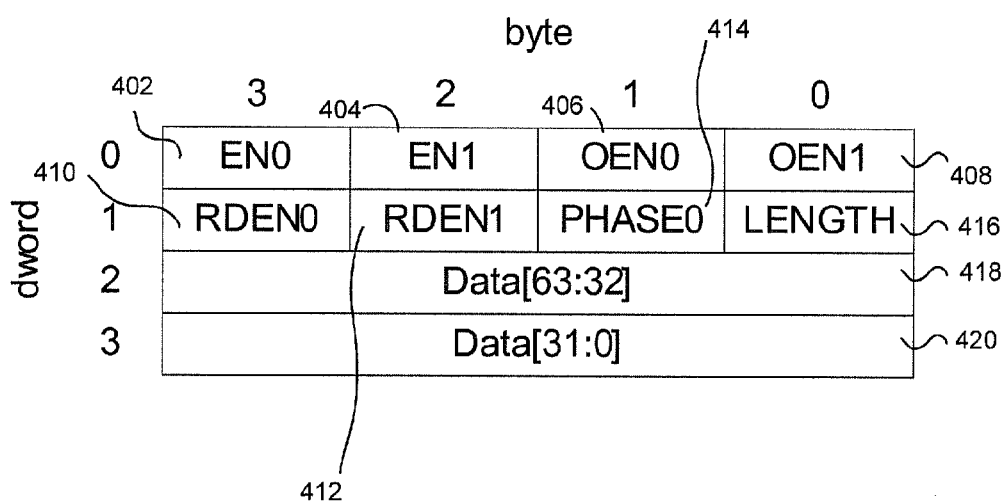
FIG. 4A is a diagram illustrating an exemplary multi-protocol command structure, in accordance with various embodiments of the invention.

In accordance with various embodiments of the invention, the radio transceivers 306a through 306f may be separate devices and it may be desirable to operate different devices with different communication protocols, or varying configurations of a same protocol. For example, the radio transceivers 306a through 306f may communicate via a 3-wire protocol, a Serial Peripheral Interface (SPI) protocol, a System Power Management Interface (SPMI), or a Nokia RF Bus (basic mode) protocol. In another exemplary embodiment of the invention, varying configurations of a same protocol may be used, for example SPMI with varying address and data field sizes for various slaves on the bus. In accordance with various embodiments of the invention, arbitrary multi-wire protocols may be operable on the serial bus 302. In these instances, it may be desirable to use a communication protocol on the serial bus 302, for example, which may be able to communicate utilizing a plurality of protocols, and may not be hard-wired to a fixed communications protocol. By utilizing multiple protocols over the serial bus 302, the bus may be very flexible to protocol changes, and topology changes in the network. Thus, it may be desirable to attach protocol information to the data packets, as illustrated in FIG. 4A. FIG. 4A is a diagram illustrating an exemplary multi-protocol command structure, in accordance with various embodiments of the invention. Referring to FIG. 4A, there is shown an exemplary 128-bit command structure 400, comprising an Enable 0 (EN0) 402 field, an Enable 1 (EN1) 404 field, an Output Enable 0 (OE0) 406 field, an Output Enable 1 (OE1) 408 field, a Read Enable 0 (RDEN0) 410 field, a Read Enable 1 (RDEN1) 412 field, a Phase 0 (PHASE0) 414 field, a Length (LENGTH) 416 field, a Data [63:32] 418 field, and a Data [31:0] 420 field.

In accordance with various embodiments of the invention, it may be desirable to include protocol information with each data transaction. In this manner, a plurality of communication protocols may be supported. In particular, protocol information fields may be attached to the data packets, as illustrated in FIG. 4A. Because each data transaction may comprise protocol information, each slave device, for example radio transceiver 306b, may utilize a different communication protocol. Thus, by sending protocol information with each data transaction, a communication protocol may be dynamically programmed, and adaptively adjusted. The communication protocol data may be 64 bit as illustrated, in FIG. 4A, or any other arbitrary bit length. The communication protocol data fields may be EN0 402 field, EN1 404 field, OE0 406 field, OE1 408 field, RDEN0 410 field, RDEN1 412 field, PHASE0 414 field, and LENGTH 416 field, as illustrated in FIG. 4A. Alternatively, the communication protocol may comprise any other arbitrary, desirable data fields. In addition, attaching protocol information for each transaction may allow dynamically programmable serial and/or parallel buses.

The EN0 402 field, may comprise a clock count, for example, which may be used to define for how many clock cycles a logic zero may be enabled. Similarly, the EN1 404 field, may comprise a clock count that may be used to define for how many clock cycles a logic zero may be enabled. Similarly, the Output Enable OEN0 406 field, the OEN1 408 field, the Read Enable RDEN0 410 field, and RDEN1 412 field may define clock counts. The PHASE0 414 field may also be defined as a clock count, defining a phase change. A phase change may, for example, indicate whether a signal may be triggered on a rising-edge clock edge or a falling-edge clock edge. The LENGTH 416 field may be used, for example, to define the length of the communication protocol information fields, to separate the data from the protocol data.

Figure 4B:
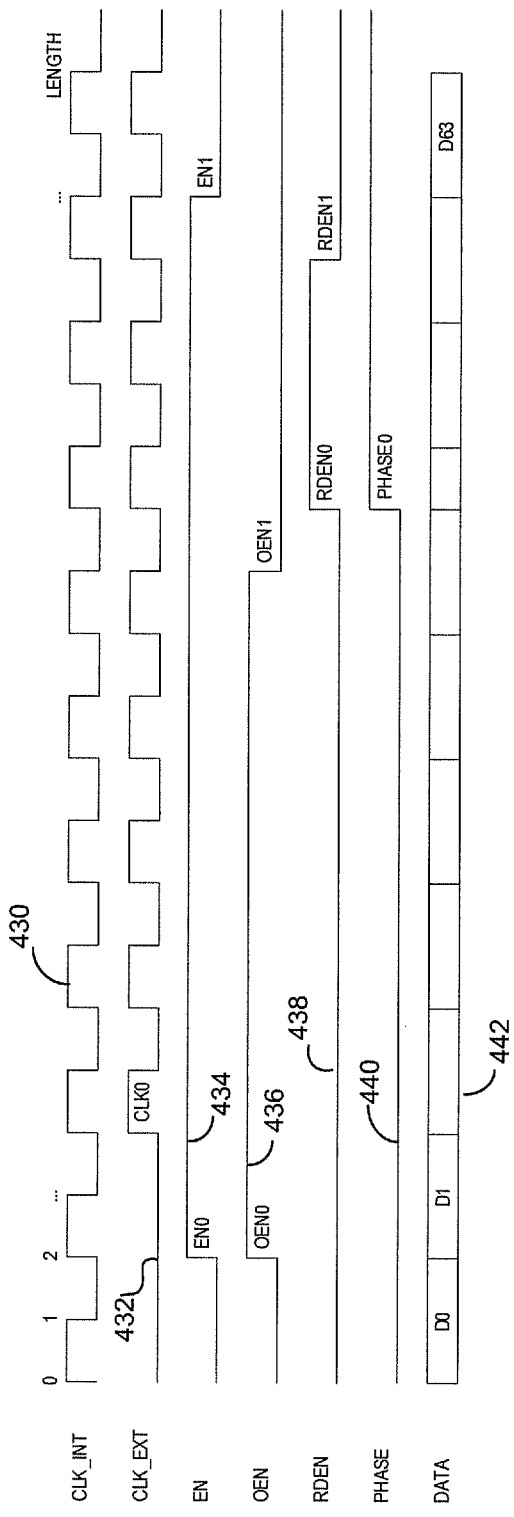
FIG. 4B is a diagram illustrating an exemplary protocol communication, in accordance with various embodiments of the invention.

FIG. 4B is a diagram illustrating an exemplary protocol communication, in accordance with various embodiments of the invention. Referring to FIG. 4B, there is shown an internal clock signal CLK_INT 430, an external clock signal CLK_EXT 432, an enable signal EN 434, and output enable signal OEN 436, a read enable signal RDEN 438, a phase signal (PHASE) 440, and a data signal 442.

The internal clock signal, CLK_INT 430, comprises, for example, an m-ary amplitude signal and associated timing information. The external clock signal, CLK_EXT 432, comprises for example, an m-ary amplitude signal and associated timing information. The enable signal, EN 434, comprises for example, an m-ary amplitude signal and associated timing information. The EN 434 signal may be utilized to enable one or more device, circuitry, logic, and/or code. The output enable signal, OEN 436, comprises for example, an m-ary amplitude signal and associated timing information. The OEN 436 signal may be utilized to enable one or more outputs via circuitry, logic, and/or code. The read enable signal, RDEN 438, comprises for example, an m-ary amplitude signal and associated timing information. The RDEN 438 signal may be utilized to enable one or more read interfaces via circuitry, logic, and/or code. The phase signal (PHASE) 440, comprises for example, an m-ary amplitude signal and associated timing information. The PHASE 440 signal may be utilized to enable one or more phase interfaces via circuitry, logic, and/or code. The data signal 442 comprises for example, an m-ary amplitude signal and associated timing information. The data signal 442 signal may be utilized to enable data communications.

In accordance with various embodiments of the invention, FIG. 4B may illustrate an exemplary time-signal diagram. For example, the EN 434 signal may be defined through the transitions/toggling from binary 1 to binary 0, defined by the clock counts in the EN0 402 and the EN1 404 fields, as illustrated in FIG. 4A and FIG. 4B. Similarly, the output enable OEN 436 may be defined through the clock counts given in OEN 406 and OEN1 408 as illustrated in FIG. 4A and FIG. 4B. Similarly, the read enable RDEN 438 may be defined through the clock counts given in RDEN0 410 and RDEN1 412 as illustrated in FIG. 4A and FIG. 4B. The phase signal and the length of the transaction may be defined through the PHASE0 414 and LENGTH fields, respectively, as illustrated in FIG. 4A and FIG. 4B.

In accordance with an embodiment of the invention, a method and system for multi-radio coexistence and a collaborative interface may comprise performing in a first communication device, for example radio transceiver 306c, coupled to a communication bus 302, attaching communication protocol information 400 to a data signal, for example data signal 442 for each data transaction with one or more other communication devices, for example radio transceivers 206a, 206b, 306a or 306b, communicatively coupled to the communication bus 302. The or more other communication devices, for example radio transceivers 106a through 106c, may be controlled utilizing the attached communication protocol information 400. The communication protocol information 400 may be dynamically adjusted and/or adaptively adjusted, for example EN0 402, EN1 404, OEN0 406, OEN1 408, RDEN0 410, RDEN1 412, PHASE0 414, and/or LENGTH 416. The communication bus 302 may be a serial or parallel communication bus. The serial communication bus 302 may be a two-wire, three-wire, or four-wire bus. The attached communication protocol information comprises a multi-wire protocol, a 3-wire protocol, a Serial Peripheral Interface (SPI) protocol, a System Power Management Interface (SPMI), or an RF Bus protocol. The communication devices may be radio transceivers, for example radio transceivers 106a through 106c, and the radio control access may be controlled utilizing the attached communication protocol information 400. One or more clock counts, for example CLK_INT 430 or CLK_EXT 432, in the attached communication protocol information may be adjusted to control one or more associated control signals.

Another embodiment of the invention may provide a machine-readable storage, having stored thereon, a computer program having at least one code section executable by a machine, thereby causing the machine to perform the steps as described herein for dynamically programmable serial/parallel bus interface.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for arbitrating communication signals comprising:
   receiving data transactions from at least two communication devices coupled to a communication bus; and
   coordinating reception and transmission of the data transactions on the communication bus from the at least two communication devices, comprising reducing the interference between low power activities of the at least two of the communication devices;
   wherein:
   the data transactions include protocol information; and
   the coordination reduces or eliminates traffic collisions using the protocol information contained within the data transactions.

2. A system for arbitrating communication signals comprising:
   at least two communication devices;
   a packet traffic arbiter (PTA); and
   a communication bus coupled to the at least two communication devices and the PTA;
   wherein:
   the PTA receives data transmissions, comprising protocol information, from the at least two communication devices;
   the PTA coordinates the reception and transmission of data transmissions from the at least two communication devices to reduce or eliminate traffic collisions using the protocol information; and
   the PTA reduces the interference between low-power activities of at least, two of the communication devices.

3. A method for arbitrating communication signals comprising:
   receiving data transactions from at least two communication devices coupled to a communication bus; and coordinating reception and transmission of the data transactions on the communication bus from the at least two communication devices;

wherein:

the data transactions include protocol information comprising transmission coordination information, handover information, and spectrum information; and the coordination reduces or eliminates traffic collisions using the protocol information contained within the data transactions.

4. The method according to claim 3, wherein the coordination further comprises aiding in making handover decisions.

5. A system for arbitrating communication signals comprising:

at least two communication devices;

a packet traffic arbiter (PTA); and a communication bus coupled to the at least two communication devices and the PTA;

wherein:

the PTA receives data transmissions, comprising protocol information comprising transmission coordination information, handover information, and spectrum information, from the at least two communication devices; and the PTA coordinates the reception and transmission of data transmissions from the at least two communication devices to reduce or eliminate traffic collisions using the protocol information.

6. The system according to claim 5, wherein the PTA uses the coordination to aid in making handover decisions.

7. The method according to claim 1, wherein the coordinating makes scanning a spectrum for nearby nodes, sending periodic messages to a nearby access point or basestation, or receiving broadcast information more efficient.

8. The method according to claim 1, wherein the coordinating reduces power consumption or increases battery life.

9. The method according to claim 1, wherein the coordinating allows both a reception of Bluetooth frames and a transmission of WLAN acknowledgement concurrently.

10. The method according to claim 3, wherein the protocol information aids in controlling the at least two communication devices.

11. The method according to claim 3, further comprising dynamically adjusting the protocol information.

12. The method according to claim 3, further comprising adaptively adjusting the protocol information.

13. The method according to claim 3, wherein the protocol information comprises a multi-wire protocol, a 3-wire protocol, a Serial Peripheral Interface protocol, a System Power Management Interface, or an RF Bus protocol.

14. The system according to claim 2, wherein the PTA makes scanning a spectrum for nearby nodes, sending periodic messages to a nearby access point or basestation, or receiving broadcast information more efficient for at least two of the communication devices.

15. The system according to claim 2, wherein the PTA reduces power consumption or increases battery life for at least two of the communication devices.

16. The system according to claim 2, wherein the PTA both receives Bluetooth frames and transmits WLAN acknowledgement concurrently.

17. The system according to claim 5, wherein the protocol information aids in controlling the at least two communication devices.

18. The system according to claim 5, wherein the PTA dynamically adjusts the protocol information.

19. The system according to claim 5, wherein the PTA adaptively adjusts the protocol information.

20. The system according to claim 5, wherein the protocol information comprises a multi-wire protocol, a 3-wire protocol, a Serial Peripheral Interface protocol, a System Power Management Interface, or an RF Bus protocol.

* * * * *

UNITED STATES PATENT AND TRADEMARK OFFICE
CERTIFICATE OF CORRECTION

PATENT NO. : 8,429,320 B2
APPLICATION NO. : 12/755755
DATED : April 23, 2013
INVENTOR(S) : du Preez et al.

Page 1 of 1

It is certified that error appears in the above-identified patent and that said Letters Patent is hereby corrected as shown below:

In the Claims

Column 8, line 40, replace "low power" with --low-power--.
Column 8, line 62, replace "at least," with --at least--.

Signed and Sealed this
Twenty-fifth Day of June, 2013

Teresa Stanek Rea
*Acting Director of the United States Patent and Trademark Office*